United States Patent
Wang et al.

(10) Patent No.: US 11,726,462 B2
(45) Date of Patent: *Aug. 15, 2023

(54) METHOD, SYSTEM AND NON-TRANSITORY COMPUTER-READABLE MEDIUM FOR REDUCING WORK-IN-PROCESS

(71) Applicant: Taiwan Semiconductor Manufacturing Company, Ltd., Hsinchu (TW)

(72) Inventors: Po-Yi Wang, Tainan (TW); Chao-Ming Cheng, Pingtung County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,383

(22) Filed: Jun. 29, 2022

(65) Prior Publication Data

US 2022/0326692 A1 Oct. 13, 2022

Related U.S. Application Data

(63) Continuation of application No. 15/983,100, filed on May 18, 2018, now Pat. No. 11,402,828.

(51) Int. Cl.
*G05B 19/418* (2006.01)

(52) U.S. Cl.
CPC ..... *G05B 19/4188* (2013.01); *G05B 19/4187* (2013.01); *G05B 2219/45031* (2013.01); *G05B 2219/49071* (2013.01); *Y02P 90/02* (2015.11)

(58) Field of Classification Search
CPC ............ G05B 19/4188; G05B 19/4187; G05B 2219/45031; G05B 2219/49071;
(Continued)

(56) References Cited

U.S. PATENT DOCUMENTS

| 7,617,017 B2 * | 11/2009 | Menassa | G05B 19/41865 700/250 |
| 8,185,226 B2 * | 5/2012 | Weigang | G05B 19/41865 700/99 |

(Continued)

OTHER PUBLICATIONS

C. M. Chan, "Dynamic cycle-time improvement through big data analytics," 2016 International Symposium on Semiconductor Manufacturing (ISSM), 2016, pp. 1-4, doi: 10.1109/ISSM.2016.7934515.*

(Continued)

*Primary Examiner* — M. N. Von Buhr
(74) *Attorney, Agent, or Firm* — JCIPRNET

(57) ABSTRACT

A method for improving a cycle time of a process of a product is provided. The method includes: collecting process profile data from a plurality of tool groups running the process, and calculating values of a plurality of key-performance-indicators (KPIs) of each tool group including calculating a standard deviation of an output of a stage of a bottleneck tool group of the tool groups; feeding the values of the KPIs and a work-in-progress (WIP) of each tool group into a neural network model in order to output an impact on the WIP for each KPI of each tool group by the neural network model; selecting a set of major KPIs of each tool group from the KPIs according to the impact of each tool group; and controlling the tool groups according to the impact of the set of major KPIs of each tool group in order to reduce a total WIP.

20 Claims, 4 Drawing Sheets

(58) Field of Classification Search
CPC ....... G05B 2219/32335; G06N 3/0445; G06N 3/0454; G06Q 10/0633; G06Q 50/04; Y02P 90/02
See application file for complete search history.

(56) References Cited

U.S. PATENT DOCUMENTS

| | | | | |
|---|---|---|---|---|
| 2002/0049621 | A1* | 4/2002 | Bruce | G06Q 10/0633 705/7.26 |
| 2011/0093308 | A1* | 4/2011 | Majeed | G06Q 10/06 705/7.27 |
| 2011/0166683 | A1* | 7/2011 | Vazquez | G05B 19/41865 700/111 |
| 2011/0282475 | A1* | 11/2011 | Ghosh | G05B 19/41865 700/100 |
| 2012/0059683 | A1* | 3/2012 | Opalach | G06Q 10/0633 705/7.27 |
| 2014/0200696 | A1* | 7/2014 | Batrin | G05B 19/41865 700/95 |
| 2015/0066592 | A1* | 3/2015 | Ehm | G06Q 30/0202 705/7.31 |
| 2016/0148850 | A1* | 5/2016 | David | G03F 7/70625 355/53 |
| 2018/0286140 | A1* | 10/2018 | Nishimura | G07C 1/02 |
| 2018/0356807 | A1* | 12/2018 | Honda | G05B 19/41885 |
| 2021/0173387 | A1* | 6/2021 | Raza | G05B 13/0205 |

OTHER PUBLICATIONS

C. Kuo, C. Chien and J. Chen, "Manufacturing Intelligence to Exploit the Value of Production and Tool Data to Reduce Cycle Time," in IEEE Transactions on Automation Science and Engineering, vol. 8, No. 1, pp. 103-111, Jan. 2011, doi: 10.1109/TASE.2010. 2040999.*

M. Nasereddin & M. Mollaghasemi, "The development of a methodology for the use of neural networks and simulation modeling in system design," WSC'99. 1999 Winter Simulation Conference Proceedings. 'Simulation—a Bridge to the Future'(Cat.No. 99CH37038), 1999, pp. 537-542 vol.1,doi: 10.1109/WSC.1999. 823130.*

K. LeCroy, M. Mollaghasemi and M. Georgiopoulos, "Application of neural networks and simulation modeling in manufacturing system design," Southcon/96 Conference Record, 1996, pp. 322-326, doi: 10.1109/SOUTHC. 1996.535087.*

* cited by examiner

| No | KPI | Improve | WIP(%) |
|---|---|---|---|
| 1 | MEAN_PROCESS_TIME | -5% | -5.02 |
| 2 | MEAN_AVAILABLE_RATE | 5% | -2.83 |
| 3 | MEAN_NUMBER_OF_MACHINE | 5% | -1.88 |
| 4 | MEAN_ARRIVAL_RATE | -5% | -1.58 |
| 5 | COV_OF_MACHINE_ID_LOADING | -5% | -1.25 |
| 6 | MEAN_USABLE_MACHINE_PERCENT | 5% | -0.97 |
| 7 | STD_OF_OD_OUT | -5% | -0.52 |
| 8 | RATIO_OF_UNSCHEDULED_DOWN | -5% | -0.47 |
| 9 | MEAN_LOT_SIZE | 5% | -0.41 |
| 10 | NUM_OF_RCP_FOR_MACHINE_GROUP | -5% | -0.38 |

FIG. 6

METHOD, SYSTEM AND NON-TRANSITORY COMPUTER-READABLE MEDIUM FOR REDUCING WORK-IN-PROCESS

CROSS-REFERENCE TO RELATED APPLICATION

This application is a continuation application of U.S. Pat. No. 11,402,828, filed on May 18, 2018. The entirety of the above-mentioned patent application is hereby incorporated by reference herein and made a part of this specification.

BACKGROUND

For manufacturing industries, a shorter cycle time amounts to a greater benefit, and therefore engineers of the manufacturing industries dedicate to reduce the cycle time of their own product. Traditionally, methodologies such as linear programming, computer simulation, and queue model as taught in the textbooks of this field are adopted to figure out the most effective actions for reducing the cycle time. However, it is unlikely to figure out the most effective actions using the traditional methodologies for the manu-factory industries in which the operation flow is rather complex. For example, in the semiconductor manufacturing industry, dozens of stages are included in the process of a wafer product, and several steps are included in each stage. That is, hundreds of steps are needed for a wafer product hence the complexity of the semiconductor manufacturing process is relatively high. As such, traditional methodologies are not reliable enough in the semiconductor manufacturing industry for digging out the key factors of the cycle time.

BRIEF DESCRIPTION OF THE DRAWINGS

Aspects of the present disclosure are best understood from the following detailed description when read with the accompanying figures. It is note that, in accordance with standard practice in the industry, various features are not drawn to scale. In fact, the dimensions of the various features may be arbitrarily increased or reduced for clarify of discussion.

FIG. 6 is a schematic diagram of an impact on the WIP for each KPI of a tool group according to an embodiment of the disclosure.

DETAILED DESCRIPTION

Figure 1:
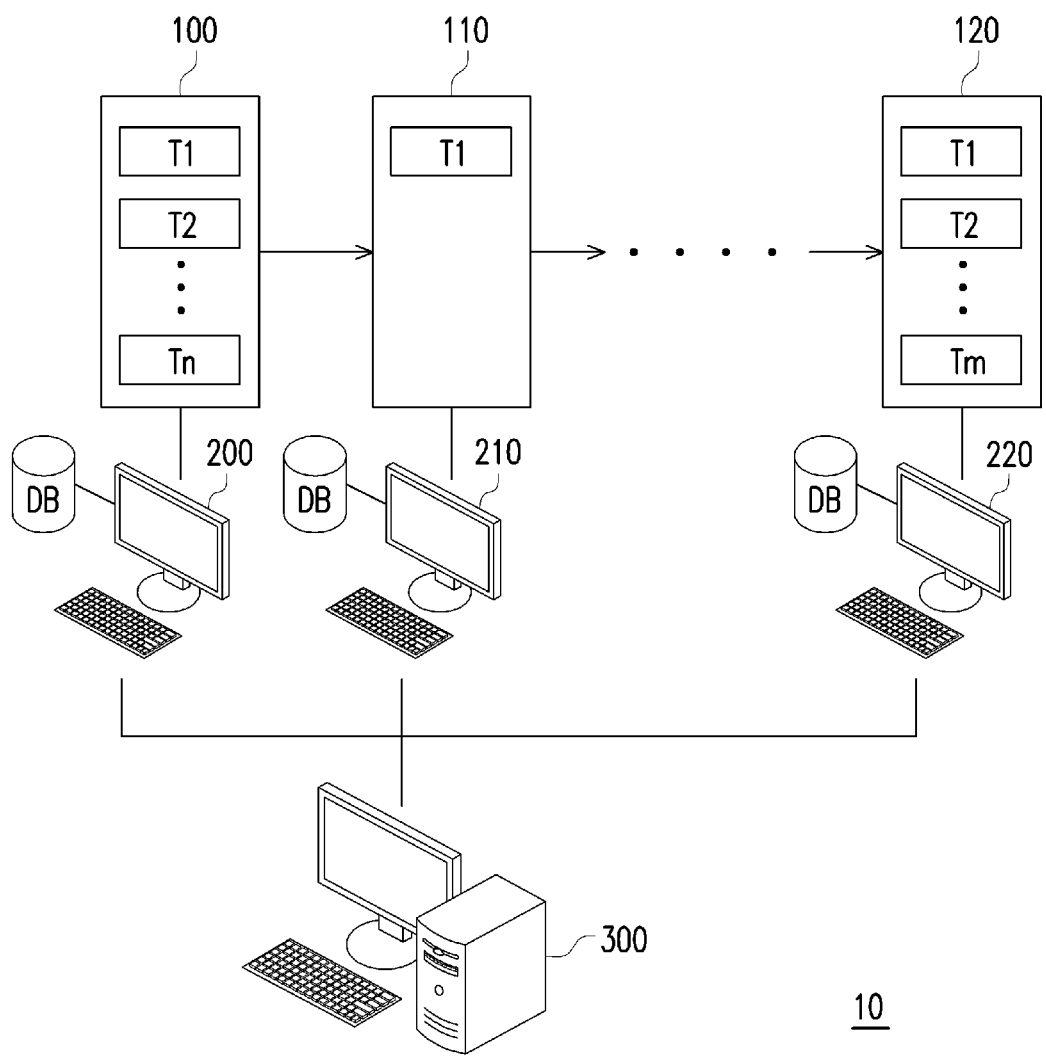
FIG. 1 is a schematic diagram of a system for improving a cycle time of a process of a product according to an embodiment of the disclosure.

The following disclosure provides many different embodiments, or examples, for implementing different features of the provided subject matter. Specific examples of components and arrangements are described below to sim-plify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accord-ingly.

In the following embodiments, wafer fabrication is used as an example for illustrating the method and system for improving a cycle time of a process of a product, but the disclosure is not limited thereto. It is noted that the method and system for improving a cycle time of a process of a product introduced in the disclosure can be adopted in any other industries.

Wafer fabrication is a very complex manufacturing process including several dozens of stages. For example, the lithography process includes at least critical stages of operation definition (OD), polysilicon (PO), and contact (CO). The OD stage is for defining parameters such as the MOS-FET (Metal Oxide Semiconductor field-effect transistor) operation area, the PO stage is for processing polysilicon as a gate electrode in MOSFET device, and the CO stage is for connecting MOSFET to metal routing. Each of the stages includes several processing and metrology steps in sequence. For example, the OD stage includes main process step such as lithography, and metrology steps such as overlay (OVL), critical dimension (CD), and viper. Therefore, tremendous amount of semiconductor-manufacturing equipment (also referred as to tools hereinafter) is config-ured in a fabrication facility (fab) of the semiconductor manufacturing industry for running these steps respectively.

In some embodiments of the disclosure, tools are grouped into tool groups, and tool groups are defined by tools that run similar step of property for process. For example, tools running the main process step of the OD, PO and CO stages are grouped into one tool group, and tools running the OVL step of the OD, PO and CO stages are grouped into another tool group. The performance of each tool group is analyzed in isolation for improving the cycle time of the whole process. However, the specific method how the tools in the fab are grouped into tool groups is not limited in the disclosure.

FIG. 1 is a schematic diagram of a system for improving a cycle time of a process of a product according to an embodiment of the disclosure. Referring to FIG. 1, system 10 includes a plurality of tool groups 100, 110, 120 coupled to a plurality of managing computer 200, 210, 220 respectively, each tool group includes at least one tool and is coupled to a managing computer, and each managing computer is coupled to a database DB. The managing computers 200, 210, 220 are all coupled to a controlling computer 300 (e.g., in a wired or wireless manner). However, the disclosure is not limited herein. In other embodiments, the controlling computer 300 may be coupled to the plurality of the tool groups 100, 110, 120 and configured to control and collect data from the plurality of tool groups 100, 110, 120 without the managing computers 200, 210, 220.

In some embodiments, each of the tool groups 100, 110, 120 includes at least one tool which is configured to run steps of a manufacturing process of a wafer product. Specifically, each of the tools is a semiconductor manufacturing equipment in the embodiments, but which is not limited herein. In the embodiments, the tool group 100 is an upstream group of the tool group 110. Specifically, products which are finished processing at a step by the tool group 100 are outputted and transferred to the tool group 110 for processing a next step. In a case in which the tool group 100 runs the $n^{th}$ step of the OD stage, products finished processing at the $n^{th}$ step of the OD stage by the tool group 100 are outputted and transferred to the tool group 110 for processing the $(n+1)^{th}$ step of the OD stage, for example. In a case in which the tool group 100 runs the last step of the OD stage, products finished processing at the last step of the OD stage by the tool group 100 are outputted and transferred to the tool group 110 for processing the first step of the stage succeeded to the OD stage (e.g., the etching stage), for example. However, the total number of the tool groups may be different between different fabs or with different grouping methods, which is not limited herein.

It is noted that not all of the downstream of the tool group 100 are depicted in FIG. 1. In other words, other tool groups served as the downstream of the tool group 100 are not shown in FIG. 1 except for the tool group 110.

In some embodiments, the managing computers 200, 210, 200 may respectively acquire process profile data from the tool groups 100, 110, 120, and store the acquired process profile data into the database DB. The process profile data includes, for example, hourly information of work-in-progress (WIP) of the corresponding tool group, number of the product fed into each stage run by the corresponding tool group, number of the product output from each stage of the corresponding tool group, etc. As such, a plurality of key-performance-indicators (KPIs) may be designed for estimating the performance of each tool group according to the process profile data. The designed KPIs will be described in the following descriptions in detail. Moreover, the managing computers 200, 210, 220 may be also configured to manage the tool groups 100, 110, and 120 respectively, such as deciding the recipes, setting the parameters, determining the dispatching priorities, etc., which are not limited in the present disclosure. In some embodiments, the managing computers 200, 210, 220 are coupled to each other as shown in FIG. 1, such that the managing computers may communicate with each other for well managing the flow of the products.

Taking the tool group 100 as an example, the tool group 100 includes tools T1 to Tn capable of running the main process step (e.g., the lithography step) of the OD, PO, and CO stages. According to a predetermined rule adopted by the industry to which the system 10 belongs, the managing computer 200 may calculate a set of parameters according to the predetermined rule and automatically allocate the tools T1 to Ti+1 of the tool group 100 for running the main process step of the OD stage, allocate the tools Ti+1 to Tj of the tool group 100 for running the main process step of the PO stage, and allocate the tools Tj+1 to Tn of the tool group 100 for running the main process step of the CO stage. Specifically, the managing computer 200 manages overall operations of the tools T1 to Tn in the tool group 100, and acquires hourly information including the WIP of the tool group 100, the number of the product fed into the OD stage (e.g., fed into the tools T1 to Ti), the number of the product fed into the PO stage (e.g., fed into the tools Ti+1 to Tj), the number of the product fed into the CO stage (e.g., fed into the tools Tj+1 to Tn), the number of the product output from the OD stage (e.g., output from the tools T1 to Ti), the number of the product output from the PO stage (e.g., output from the tools Ti+1 to Tj), and the number of the product output from the CO stage (e.g., output from the tools Tj+1 to Tn), and stores the acquired information into the connected database DB. Other managing computers manage other tool groups and acquire the process profile data of other tool groups in a similar way described above, and which are not repeated in the description. It is noted that the number of tools in one tool group is not limited. In the present embodiment, there is only one tool T1 in the tool group 110, and there are m tools T1 to Tm in the tool group 120.

Figure 2:
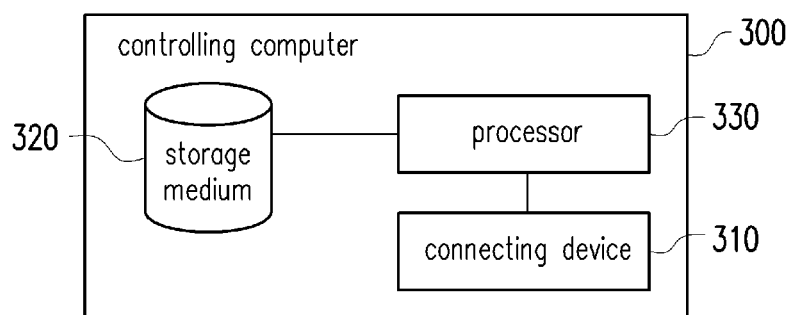
FIG. 2 is a block diagram of a controlling computer according to an embodiment of the disclosure.

FIG. 2 is a block diagram of a controlling computer according to an embodiment of the disclosure. Referring to FIG. 2, the controlling computer 300 includes a connecting device 310, a storage medium 320, and a processor 330 coupled to the connecting device 310 and the storage medium 320, and is configured to perform the method introduced in the disclosure for improving the cycle time of the process of the product.

The connecting device 310 is configured to connect to the managing computers 200, 210, 220 for receiving signals from and transmitting signals to the managing computers 200, 210, 220. As such, data of the tool groups 100, 110, 120 can be transmitted to the controlling computer 300 and the tool groups 100, 110, 120 can be controlled by the controlling computer 300 through the managing computers 200, 210, 220. The connecting device 310 is, for example, any wired or wireless interface compatible to the managing computers 200, 210, 220 such as a cable, USB, firewire, thunderbolt, universal asynchronous receiver/transmitter (UART), serial peripheral interface bus (SPI), WiFi, or Bluetooth, which is not limited herein.

The storage medium 320 is configured to store data. The storage medium 320 is, for example, a fixed or mobile random access memory (RAM), read-only memory (ROM), flash memory, hard disk drive in any form, another similar device, or a combination of these devices. It is noted that the disclosure in not limited thereto.

The processor 330 is responsible for the overall operation of the controlling computer 300. In other words, the processor 330 is like a brain of the controlling computer 300 which instructs each elements of the controlling computer 300 to perform its own function. Specifically, the processor 330 is configured to collect the process profile data of the tool groups 100, 110, 120 through the managing computers 200, 210, 220 using the connecting device 310, do statistics and analysis, and further feedback the analysis results to the managing computers 200, 210, 220 using the connecting device 310 for controlling the tool groups 100, 110, 120, by performing the method introduced in the disclosure for improving the cycle time of the process of the product. The processor 330 is, for example, a central processing unit (CPU), other programmable general-purpose or specific-purpose microprocessors, a digital signal processor (DSP), a programmable controller, an application specific integrated circuit (ASIC), a programmable logic device (PLD), other similar devices, or a combination thereof, for example. It should be noted that the disclosure is not limited thereto.

Details of the method for improving the cycle time of the process of the product are described in the following descriptions.

According to Little's law, one way to improve the cycle time is to increase the capacity of the fab, and another way is to reduce the total WIP in the fab. Increasing the capacity of a fab generally involves purchase or updating the manufacturing equipment which costs a lot. As a result, the method for improving the cycle time described in the following embodiments is focused on reducing the total WIP in the fab.

Figure 3:
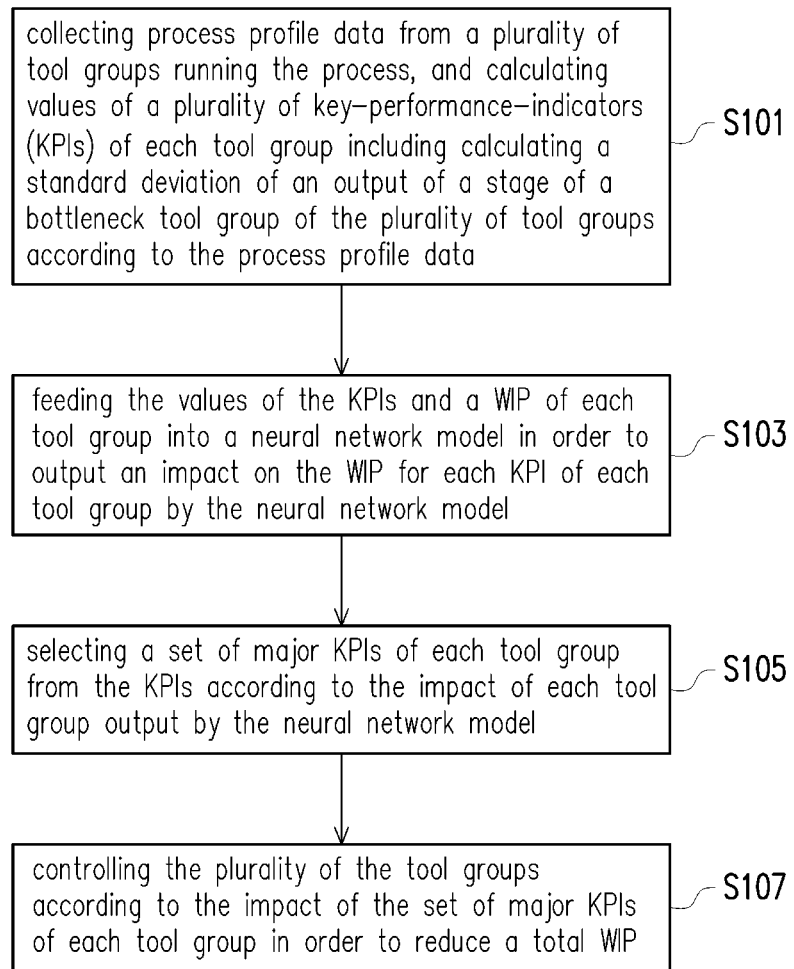
FIG. 3 is a flowchart a method for improving a cycle time of a process of a product according to an embodiment of the disclosure.

FIG. 3 is a flowchart of a method for improving a cycle time of a process of a product according to an embodiment of the disclosure. The method of the embodiments of FIG. 3 is applicable to the aforementioned system 10 of embodiments of FIG. 1 including the controlling computer 300 illustrated in FIG. 2, and elements of the system 10 are used for exemplarily describing steps of the method for description convenience in the following passages.

Referring to FIG. 3, in step S101, the controlling computer 300 may collect process profile data from the tool groups 100, 110, 120 running the process by using the connecting device 330, and calculate values of a plurality of KPIs of each tool group comprising calculating a standard deviation of an output of a stage of a bottleneck tool group of the tool groups 100, 110, 120 according to the process profile data by using the processor 330. In some embodiments, the controlling computer 300 may collect process profile data of the tool groups 100, 110, 120 from the databases DB coupled to the managing computers 200, 210, 220.

In some embodiments, multiple KPIs that are probable of effecting the WIP of each tool group are defined and calculated according to the process profile data acquired from the tool groups 100, 110, 120. For example, some of the KPIs may be defined as the average and the standard deviation of the arrival rate in each tool group, since the average and the standard deviation of the arrival rate may affect the WIP of each tool group. In some embodiments, only the KPIs controllable by the controlling computer 300 are defined, such that the KPIs can be automatically controlled for reducing the WIP of each tool group by the controlling computer 300 or through the managing computers 200, 210, 220 after being analyzed. However, the details of the defined KPIs are not limited in the disclosure.

In some embodiments, some of the KPIs are defined as the standard deviation of an output of each of a plurality of stages of the bottleneck tool group. In these embodiments, the bottleneck tool group is one of the plurality of tool groups having the greatest amount of pileups. For example, the amount of products waiting to be processed in the tool group 100 which runs the lithography step of the OD, PO, and CO stages is usually largest among all tool groups, and therefore the tool group 100 is the bottleneck tool group that has the greatest amount of pileups in this case. As such, the controlling computer 300 may calculate the standard deviation of the output from each stage of the tool group 100 every a predetermined number of days according to the process profile data to serve as the KPIs.

The "standard deviation of the output of a stage of the bottleneck tool group" may be resulted from demand changes, variations of daily situation of the tools, the adopted dispatching rules, or the like. It is noted that the standard deviation of the output of a stage of the bottleneck tool group not only affects the tool groups succeeded to the bottleneck tool group, but also affects several downstream tool groups. For example, standard deviation of the output of a stage of the tool group 120 may be significantly affected by the standard deviation of the output of a stage of the tool group 100 in which tools are processed several steps before the tool group 120. Accordingly, the "standard deviation of the output of each stage of the bottleneck tool group" is a useful indicator for evaluating or controlling the total performance.

Figure 4:
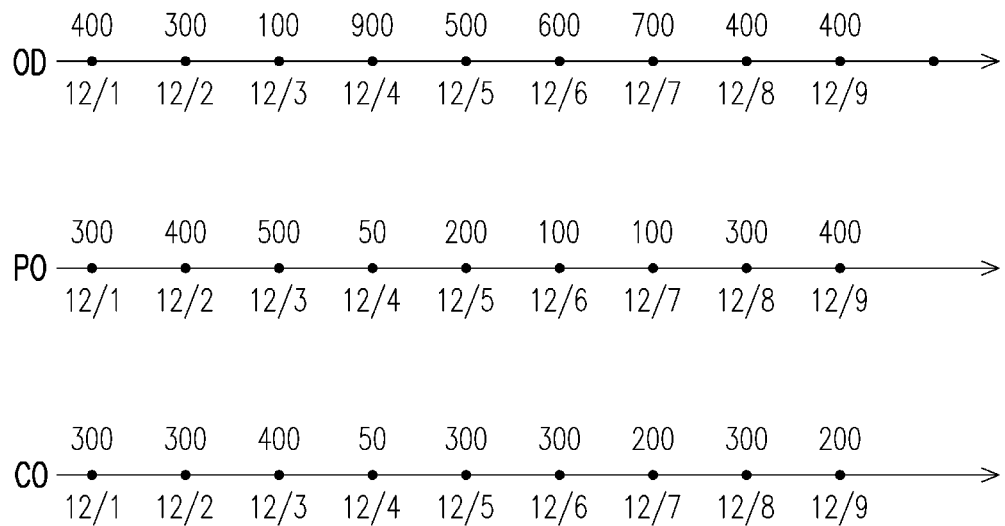
FIG. 4 is a schematic diagram of calculating a standard deviation of an output of each stage of the bottleneck tool group according to an embodiment of the disclosure.

FIG. 4 is a schematic diagram of calculating a standard deviation of an output of each stage of the bottleneck tool group according to an embodiment of the disclosure. Referring to FIG. 4, the process profile data is collected from day 12/1, for example. In the embodiment, one of the KPIs is a seven-day standard deviation of the output of the OD stage of tool group 100 (e.g., output from tools T1 to Ti), one of the KPIs is a seven-day standard deviation of the output of the PO stage of tool group 100 (e.g., output from tools Ti+1 to Tj), one of the KPIs is a seven-day standard deviation of the output of the CO stage of tool group 100 (e.g., output from tools Tj+1 to Tn). Specifically, the controlling computer 300 may calculate a standard deviation of a seven-day output of the OD stage, i.e., 400, 300, 100, 900, 500, 600, 700 from 12/1 to 12/7 to serve as a KPI. In some embodiments, another standard deviation of another seven-day output of the OD stage, i.e., 300, 100, 900, 500, 600, 700, 400 from 12/2 to 12/8 may be served as a KPI, and yet another standard deviation of yet another seven-day output of the OD stage, i.e., 100, 900, 500, 600, 700, 400, 400 from 12/3 to 12/9 may be served as a KPI, and so on. On the other hand, the seven-day standard deviations of the PO and CO stages of the tool group 100 are also calculated in a similar way to be served as the other KPIs, which is not repeated herein.

It is noted that the standard deviations of the output of the OD, PO, CO stages are controllable by adjusting the dispatching priority of the bottleneck tool group 100 by the controlling computer 300 or the managing computers 200, 210, 220. For example, the managing computer 200 may calculate a new set of parameters for re-allocating each of the tools T1 to Tn to run in the OD, PO, or CO stage, such that the standard deviations of the output of the OD, PO, CO stages can be reduced.

In some embodiments, the controlling computer 300 may correct the process profile data collected from the tool groups 100, 110, 120 in advance of calculating the KPIs, since the process profile data may not correctly reflect the real performance of the tool groups 100, 110, 120. Therefore, the controlling computer 300 may correct the collected process profile data by re-allocating the WIP of the tool groups 100, 110, 120, such that the corrected WIP of each tool group can reflect real performance of each tool group. An exemplary embodiment of the aforementioned correction is illustrated accompanied with FIG. 5 in the following.

Figure 5:
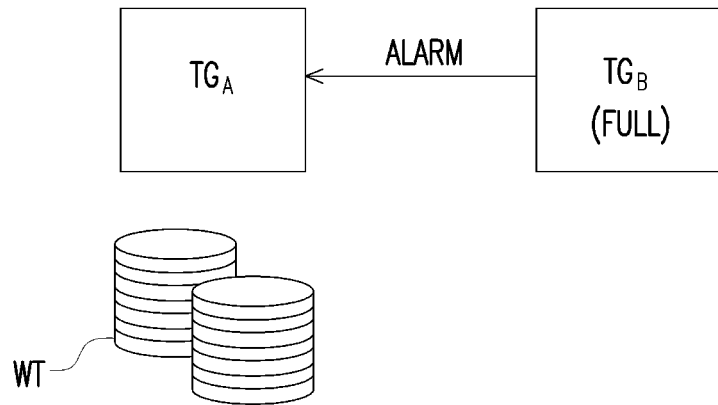
FIG. 5 is a schematic diagram of correcting the process profile data according to an embodiment of the disclosure.

FIG. 5 is a schematic diagram of correcting the process profile data according to an embodiment of the disclosure. Referring to FIG. 5, the tool group $TG_A$ is an upstream of the tool group $TG_B$. In the embodiment, a tool group $TG_B$ (tool group 110, for example) is full and not being available to process the coming products in a limited time (e.g., 6 hours). In order to avoid the quality issue, in some cases, an alarm may be sent to the upstream tool group $TG_A$ (tool group 100, for example) in order to avoid the products WT finished by the tool group $TG_A$ transferring to the tool group $TG_B$. Consequently, the products WT that are finished by the tool group $TG_A$ are still waiting in the tool group $TG_A$ and are counted on the WIP of the tool group $TG_A$ in the collected process profile data while the products WT should have been counted on the WIP of the tool group $TG_B$. To this end, the controlling computer 300 may correct the collected process profile data by re-allocating the WIPs of the tool groups $TG_A$ and $TG_B$, in order to count the product WT on the WIP of the tool group $TG_B$ in the corrected process profile data. After the process profile data is corrected, the controlling computer 300 can calculate the KPIs according to the corrected process profile data.

Referring to FIG. 3, after values of the KPIs are calculated, in step S103, the controlling computer 300 may feed the values of the KPIs and a WIP of each tool group into a neural network model in order to output an impact on the WIP for each KPI of each tool group by the neural network model by using the processor 330.

Specifically, the neural network model is an artificial intelligence model that receives the values of the KPIs and the WIP of each tool group in the process profile data, performs a sensitivity analysis on the received values of the KPIs and the WIP of each tool group, and outputs the impact on the WIP for each KPI of each tool group. In some embodiments, process profile data of 180 days are collected, and the process profile data of the first 150 days are used for training the neural network model. To be specific, the controlling computer 300 may calculate values of the KPIs according to the process profile data of the first 150 days, and feeding the calculated values of KPIs and the WIP of each tool group in the process profile data of the first 150 days into the neural network model. By performing the sensitivity analysis on these fed data, the neural network model outputs an impact on the WIP for each KPI of each tool group, where the impact shows a rate of change of the WIP resulting from a predetermined improvement of each KPI. In the embodiments, the process profile data of the last 30 days are used for testing the accuracy of the trained neural network model.

FIG. 6 is a schematic diagram of an impact on the WIP for each KPI of a tool group according to an embodiment of the disclosure. Referring to FIG. 6, in the embodiment, several KPIs (e.g., 46 KPIs) are collected and part of the collected KPIs (e.g., 37 KPIs) are used to feed into neural network model and the impact on the WIP of 10 KPIs of the tool group 100 are shown in FIG. 6. For example, when the KPI of the average of the processing time (i.e., named MEAN_PROCESS_TIME) improves 5%, the WIP of the tool group 100 drops 5.02%; when the KPI of the average of the arrival rate (i.e., named MEAN_AVALIBALE_RATE) improves 5%, the WIP of the tool group 100 drops 2.83%, and when the KPI of the standard deviation of the output of the OD stage (i.e., named STD_OF_OD_OUT) improves 5%, the WIP of the tool group 100 drops 0.52%, and so on. Based on the impact output by the neural network model, at least one of the KPIs which has greater impact on the WIP can be figured out. However, the number of KPIs fed into the neural network model is not limited in the disclosure.

It is noted that the term "improve" of the embodiments of FIG. 6 means a KPI change that is capable of reducing the WIP in the prediction of the queueing theory. For example, the shorter the average process time, the fewer the WIP. Therefore, "improving" the average process time means to "reduce" the average process time. In the embodiments, the impacts on the WIP for each KPI of other groups (not shown) are also output by the neural network model.

In some embodiments, an initial WIP of each tool group may be fed into the neural network model accompanied with the WIP of each tool group. The initial WIP is a WIP at a starting time for collecting the process profile data. For example, the WIP is an hourly data of each tool group collected from day 12/1, and the data of the WIP of each tool group may start from the first hour of day 12/1, then the initial WIP of each tool group is the WIP of each tool group at the $0^{th}$ hour of day 12/1, or say, at the last hour of day 11/30 in some embodiments. By feeding the initial WIP of each tool group for training the neural network model, the accuracy of the trained neural network model can be improved.

Referring to FIG. 3, in step S105, the processor 330 of the controlling computer 300 may select a set of major KPIs of each tool group from the KPIs according to the impact of each tool group output by the neural network model. In some embodiments, the controlling computer 300 may select the set of major KPIs of each tool group from the KPIs according to the impact of each tool group based on an 80/20 rule, but which is not limited herein.

Specifically, the controlling computer 300 may select a predetermined percentage (e.g., based on 80/20 rule) of the KPIs that affects the WIP most into the set of major KPIs. Taking the tool group 100 as an example, 37 KPIs are defined and the impact on the WIP for each of the 37 KPIs are obtained from the neural network model. Based on the 80/20 rule, improving 7 or 8 KPIs that affect the WIP most is the most efficient way for reducing the WIP. Accordingly, the first 8 KPIs having the greatest impact on the WIP are selected into the set of major KPIs of the tool group 100 as shown in FIG. 6.

Referring to FIG. 3, in step S107, the controlling computer 300 may control the tool groups 100, 110, 120 according to the impact of the set of major KPIs of each tool group in order to reduce a total WIP by using the connecting device 310, where the total WIP is a summation of the WIP of each tool group. In some embodiments, the controlling computer 300 may control the tool groups 100, 110, 120 by sending an instruction using the connecting device 310 to command the managing computer 200, 210, 220 to adjust a management approach thereof.

Specifically, the controlling computer 300 may integrate all the impacts of the tool groups 100, 110, 120, and calculate an optimal adjustment to KPIs of each of the tool groups 100, 110, 120 for minimizing the total WIP. Finally, the controlling computer 300 may send a signal to each of the managing computers 200, 210, 220 according to the calculation result, such that the managing computers 200, 210, 220 can adjust the management approaches such as changing the recipes, tuning the parameters, or adjusting the dispatching priorities, according to the signal received from the controlling computer 300.

For example, the KPI of the standard deviation of the output of the OD stage is selected into the set of major KPIs of tool group 100 in the embodiment of FIG. 6. In this case, the controlling computer 300 may send a signal to the managing computer 200 in order that the managing computer 200 may automatically adjust the dispatching rule of the tool group 100 for running the OD, PO, and CO stages by the tools T1 to Tn. Once the standard deviation of the output of the OD stage is reduced in response to the adjustment of the dispatching rule, the WIP of the tool group 100 may be automatically improved, and the total WIP may be automatically improved as well.

A non-transitory computer-readable medium is also introduced in an embodiment of the disclosure as below. The non-transitory computer-readable medium incudes processor executable instructions. When the instructions are executed by a processor, the method for improving a cycle time of a process of a product as described before can be implemented.

According to some embodiments, a method for improving a cycle time of a process of a product includes collecting process profile data from a plurality of tool groups running the process, and calculating values of a plurality of KPIs of each tool group including calculating a standard deviation of an output of a stage of a bottleneck tool group of the plurality of tool groups according to the process profile data, feeding the values of the KPIs and a WIP of each tool group into a neural network model in order to output an impact on the WIP for each KPI of each tool group by the neural network model, selecting a set of major KPIs of each tool group from the KPIs according to the impact of each tool group output by the neural network model, and controlling the plurality of the tool groups according to the impact of the set of major KPIs of each tool group in order to reduce a total WIP. In which, the total WIP is a summation of the WIP of each tool group.

According to some embodiments, a system for improving a cycle time of a process of a product includes a plurality of tool groups and a controlling computer coupled to the plurality of tool groups. The tool groups are configured to run the process, and the controlling computer is configured to collect process profile data from the plurality of tool groups, and calculate values of a plurality of KPIs of each tool group including calculating a standard deviation of an output of a stage of a bottleneck tool group of the plurality of tool groups according to the process profile data, to feed the values of the KPIs and a WIP of each tool group into a neural network model in order to output an impact on the WIP for each KPI of each tool group by the neural network model, to select a set of major KPIs of each tool group from the KPIs according to the impact of each tool group output by the neural network model, and to control the plurality of tool groups according to the impact of the set of major KPIs of each tool group in order to reduce a total WIP. In which, the total WIP is a summation of the WIP of each tool group.

According to some embodiments, a non-transitory computer-readable medium includes processor executable instructions that when executed perform a method for improving a cycle time of a process of a product. The method includes collecting process profile data from a plurality of tool groups running the process, and calculating values of a plurality of KPIs of each tool group including calculating a standard deviation of an output of a stage of a bottleneck tool group of the plurality of tool groups according to the process profile data, feeding the values of the KPIs and a WIP of each tool group into a neural network model in order to output an impact on the WIP for each KPI of each tool group by the neural network model, selecting a set of major KPIs of each tool group from the KPIs according to the impact of each tool group output by the neural network model, and controlling the plurality of the tool groups according to the impact of the set of major KPIs of each tool group in order to reduce a total WIP. In which, the total WIP is a summation of the WIP of each tool group.

Based on the above, the method, system, and non-transitory computer-readable medium provided in the embodiments of the disclosure define multiple KPIs and analyze the impact on the WIP for each KPI of each tool group by a neural network model, then feedback the analysis result, so as to automatically control the tool groups for reducing the total WIP.

In addition, improvement of the KPIs associated with an absolute value such as the average usually cost more than improvement of the KPIs associated with a variation such as the standard deviation. In the embodiments of the disclosure, the KPIs associated with the standard deviation are defined and analyzed, therefore the KPIs of the tool groups can be easily and automatically improved in response to the analysis result.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for reducing a work-in-progress (WIP) in a process of a product, the method comprising:
   collecting process profile data from a plurality of tool groups running the process, correcting the collected process profile data by allocating the WIP finished in an upstream tool group but not transferred to a downstream tool group of the upstream tool group due to full loading of the downstream tool group to the WIP of the downstream tool group, and calculating a standard deviation of an output of a stage of a bottleneck tool group of the plurality of tool groups according to the corrected process profile data to serve as values of at least one of a plurality of key-performance-indicators (KPIs) of each tool group;
   feeding the values of the KPIs and the WIP of each tool group into a neural network model in order to output an impact on the WIP for each KPI of each tool group by the neural network model, wherein the neural network model is trained by feeding the values of the KPIs and the WIP of each tool group in the process profile data of a plurality of days collected in advance, and performing sensitivity analysis on the values of the KPIs and the WIP so as to output the impact showing a rate of change of the WIP resulting from a predetermined change of each KPI;
   selecting a predetermined percentage of the KPIs for each tool group as a set of major KPIs according to the impact on the WIP for each KPI of each tool group output by the neural network model; and
   controlling the plurality of the tool groups according to the impact of the set of major KPIs of each tool group in order to reduce a total WIP, wherein the total WIP is a summation of the WIP of each tool group.

2. The method as claimed in claim 1, wherein the process profile data comprises an output from each of a plurality of stages run by each tool group, wherein calculating the standard deviation of the output of the stage of the bottleneck tool group comprises:
   calculating the standard deviation of the output from the stage of the bottleneck tool group every a predetermined number of days according to the process profile data.

3. The method as claimed in claim 1, wherein the bottleneck tool group is one of the plurality of tool groups having the greatest amount of pileups.

4. The method as claimed in claim 3, wherein the standard deviation of the output of the stage of the bottleneck tool group is selected into the set of major KPIs of the bottleneck tool group, and controlling the plurality of the tool groups comprises:

adjusting a dispatching priority of the bottleneck tool group.

5. The method as claimed in claim 1, wherein feeding the values of the KPIs and the WIP of each tool group into the neural network model in order to output the impact on the WIP for each KPI of each tool group by the neural network model comprises:

feeding an initial WIP of each tool group into the neural network model, wherein the initial WIP is a WIP at a starting time for collecting the process profile data.

6. The method as claimed in claim 1, wherein the predetermined percentage is about 20 percent.

7. The method as claimed in claim 1, wherein the KPIs are automatically controllable by a controlling computer.

8. The method as claimed in claim 1, wherein each tool group comprises at least one tool, and each tool is semiconductor-manufacturing equipment.

9. A system for reducing a work-in-progress (WIP) in a process of a product, comprising:

a plurality of tool groups configured to run the process; and a controlling computer coupled to the plurality of tool groups, and configured to:

collect process profile data from the plurality of tool groups, correct the collected process profile data by allocating the WIP finished in an upstream tool group but not transferred to a downstream tool group of the upstream tool group due to full loading of the downstream tool group to the WIP of the downstream tool group, and calculate a standard deviation of an output of a stage of a bottleneck tool group of the plurality of tool groups according to the corrected process profile data to serve as values of at least one of a plurality of key-performance-indicators (KPIs) of each tool group;

feed the values of the KPIs and the WIP of each tool group into a neural network model in order to output an impact on the WIP for each KPI of each tool group by the neural network model, wherein the neural network model is trained by feeding the values of the KPIs and the WIP of each tool group in the process profile data of a plurality of days collected in advance, and performing sensitivity analysis on the values of the KPIs and the WIP so as to output the impact showing a rate of change of the WIP resulting from a predetermined change of each KPI;

select a predetermined percentage of the KPIs for each tool group as a set of major KPIs according to the impact on the WIP for each KPI of each tool group output by the neural network model; and control the plurality of tool groups according to the impact of the set of major KPIs of each tool group in order to reduce a total WIP, wherein the total WIP is a summation of the WIP of each tool group.

10. The system as claimed in claim 9, wherein the process profile data comprises an output from each of a plurality of stages run by each tool group, wherein when the controlling computer calculates the standard deviation of the output of the stage of the bottleneck group, the controlling computer is configured to:

calculate the standard deviation of the output from the stage of the bottleneck tool group every a predetermined number of days according to the process profile data.

11. The system as claimed in claim 9, wherein the bottleneck tool group is one of the plurality of tool groups having the greatest amount of pileups.

12. The system as claimed in claim 11, wherein the controlling computer selects the standard deviation of the output of the stage of the bottleneck group into the set of major KPIs of the bottleneck tool group, wherein when the controlling computer controls the plurality of tool groups, the controlling computer is configured to:

adjust a dispatching priority of the bottleneck tool group.

13. The system as claimed in claim 9, wherein when the controlling computer feeds the values of the KPIs and the WIP of each tool group into the neural network model in order to output the impact on the WIP for each KPI of each tool group by the neural network model, the controlling computer is further configured to:

feed an initial WIP of each tool group into the neural network model, wherein the initial WIP is a WIP at a starting time for collecting the process profile data.

14. The system as claimed in claim 9, wherein the predetermined percentage is about 20 percent.

15. The system as claimed in claim 9, wherein each tool group comprises at least one tool, and each tool is semiconductor-manufacturing equipment.

16. A non-transitory computer-readable medium comprising processor executable instructions that when executed perform a method for reducing a work-in-progress (WIP) in a process of a product, the method comprising:

collecting process profile data from a plurality of tool groups running the process, correcting the collected process profile data by allocating the WIP finished in an upstream tool group but not transferred to a downstream tool group of the upstream tool group due to full loading of the downstream tool group to the WIP of the downstream tool group, and calculating a standard deviation of an output of a stage of a bottleneck tool group of the plurality of tool groups according to the corrected process profile data to serve as values of at least one of a plurality of key-performance-indicators (KPIs) of each tool group;

feeding the values of the KPIs and the WIP of each tool group into a neural network model in order to output an impact on the WIP for each KPI of each tool group by the neural network model, wherein the neural network model is trained by feeding the values of the KPIs and the WIP of each tool group in the process profile data of a plurality of days collected in advance, and performing sensitivity analysis on the values of the KPIs and the WIP so as to output the impact showing a rate of change of the WIP resulting from a predetermined change of each KPI;

selecting a predetermined percentage of the KPIs for each tool group as a set of major KPIs according to the impact on the WIP for each KPI of each tool group output by the neural network model; and controlling the plurality of the tool groups according to the impact of the set of major KPIs of each tool group in order to reduce a total WIP, wherein the total WIP is a summation of the WIP of each tool group.

17. The non-transitory computer-readable medium as claimed in claim 16, wherein the process profile data comprises an output from each of a plurality of stages run by each tool group, wherein calculating the standard deviation of the output of the stage of the bottleneck tool group comprises:

calculating the standard deviation of the output from the stage of the bottleneck tool group every a predetermined number of days according to the process profile data.

18. The non-transitory computer-readable medium as claimed in claim 16, wherein the bottleneck tool group is one of the plurality of tool groups having the greatest amount of pileups.

19. The non-transitory computer-readable medium as claimed in claim 18, wherein the standard deviation of the output of the stage of the bottleneck tool group is selected into the set of major KPIs of the bottleneck tool group, and controlling the plurality of the tool groups comprises:

adjusting a dispatching priority of the bottleneck tool group.

20. The non-transitory computer-readable medium as claimed in claim 16, wherein the predetermined percentage is about 20 percent.

* * * * *